(12) United States Patent
Sadano

(10) Patent No.: US 6,853,884 B2
(45) Date of Patent: Feb. 8, 2005

(54) LANE-KEEP CONTROL SYSTEM FOR VEHICLE

(75) Inventor: On Sadano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/173,653

(22) Filed: Jun. 19, 2002

(65) Prior Publication Data

US 2003/0014162 A1 Jan. 16, 2003

(30) Foreign Application Priority Data

Jul. 13, 2001 (JP) ........................................ 2001-213345

(51) Int. Cl.$^7$ ................................................ G06F 7/00
(52) U.S. Cl. ................................ 701/1; 701/8; 701/41; 701/96; 701/301; 340/435; 340/436; 340/901
(58) Field of Search ........................... 701/1, 8, 41, 93, 701/96, 301; 340/435, 436, 903

(56) References Cited

U.S. PATENT DOCUMENTS

| | | | | |
|---|---|---|---|---|
| 5,701,127 A | * | 12/1997 | Sharpe | |
| 6,064,320 A | * | 5/2000 | d'Hont et al. | 340/933 |
| 6,198,426 B1 | * | 3/2001 | Tamatsu et al. | 342/70 |
| 6,263,270 B1 | | 7/2001 | Sato et al. | |
| 6,269,307 B1 | * | 7/2001 | Shinmura et al. | 701/301 |
| 6,323,763 B1 | | 11/2001 | Bohner et al. | |
| 6,353,788 B1 | | 3/2002 | Baker et al. | |
| 6,418,370 B1 | * | 7/2002 | Isogai et al. | 701/96 |
| 2001/0016797 A1 | | 8/2001 | Ogura et al. | |
| 2003/0097206 A1 | * | 5/2003 | Matsumoto et al. | |
| 2003/0120414 A1 | * | 6/2003 | Matsumoto et al. | |
| 2003/0173127 A1 | | 9/2003 | Noecker | |

FOREIGN PATENT DOCUMENTS

| | | |
|---|---|---|
| DE | 197 52 175 A1 | 5/1998 |
| DE | 198 35 601 A1 | 2/2000 |
| EP | 0 970 875 A2 | 1/2000 |
| EP | 1 063 149 A2 | 12/2000 |
| JP | 10-203394 | 8/1998 |
| JP | 11-255051 | 9/1999 |
| JP | 11-286280 | 10/1999 |
| WO | WO 99/30919 A1 | 6/1999 |
| WO | WO 01/98101 A1 | 12/2001 |

* cited by examiner

*Primary Examiner*—Gertrude A. Jeanglaude
(74) *Attorney, Agent, or Firm*—Foley & Lardner LLP

(57) ABSTRACT

A lane-keep control system for a host-vehicle is arranged to execute a lane-keep control for moving the host-vehicle in a traveling lane, to determine whether there is an approaching-vehicle behind the host-vehicle, to increase an intervention threshold when there is the approaching vehicle behind the host-vehicle, and to suspend the lane-keep control when a steering control indicative value due to driver intervention is greater than the intervention threshold.

11 Claims, 4 Drawing Sheets

LANE-KEEP CONTROL SYSTEM FOR VEHICLE

BACKGROUND OF THE INVENTION

The present invention relates to a lane-keep control system which controls the vehicle so as to travel within a target lane.

Japanese Patent Provisional Publication No. 11-286280 discloses an automatic cruise control system which is arranged to stop an automatic cruise control when a steering operation indicative value due to driver intervention is greater than a threshold.

SUMMARY OF THE INVENTION

However, this stop of the automatic cruise control is executed regardless an existence of an approaching subsequent-vehicle relative to a host-vehicle. Accordingly, even if the subsequent-vehicle overtakes and passes the host-vehicle, the automatic cruise control is stopped by a similar manner in a condition that there is no subsequent-vehicle, and this arrangement never restrict the driver to control the host-vehicle to the lane to be passed by the subsequent vehicle.

It is therefore an object of the present invention to provide an improved lane-keep control system which effectively prevents the host-vehicle from deviating from a traveling lane to an adjacent lane when the subsequent vehicle overtakes and passes the host-vehicle through the adjacent lane.

An aspect of the present invention resides in a lane-keep control system which is for a host-vehicle and comprises a control unit. The control unit is programmed to execute a lane-keep control for moving the host-vehicle in a traveling lane, to determine whether there is an approaching-vehicle behind the host-vehicle, to increase an intervention threshold when there is the approaching vehicle behind the host-vehicle, and to suspend the lane-keep control when a steering control indicative value due to driver intervention is greater than the intervention threshold.

Another aspect of the present invention resides in a method of executing a lane-keep control of a host-vehicle, which method comprises a step of executing a lane-keep control for moving the host-vehicle in a traveling lane; a step of determining whether there is an approaching-vehicle behind the host-vehicle; a step of increasing an intervention threshold when there is the approaching vehicle behind the host-vehicle; and step of suspending the lane-keep control when a steering control indicative value due to driver intervention is greater than the intervention threshold.

The other objects and features of this invention will become understood from the following description with reference to the accompanying drawings.

DETAILED DESCRIPTION OF THE INVENTION

Referring to FIGS. 1 through 5, there is shown an embodiment of a lane-keep control system for a host-vehicle according to the present invention.

Figure 1:
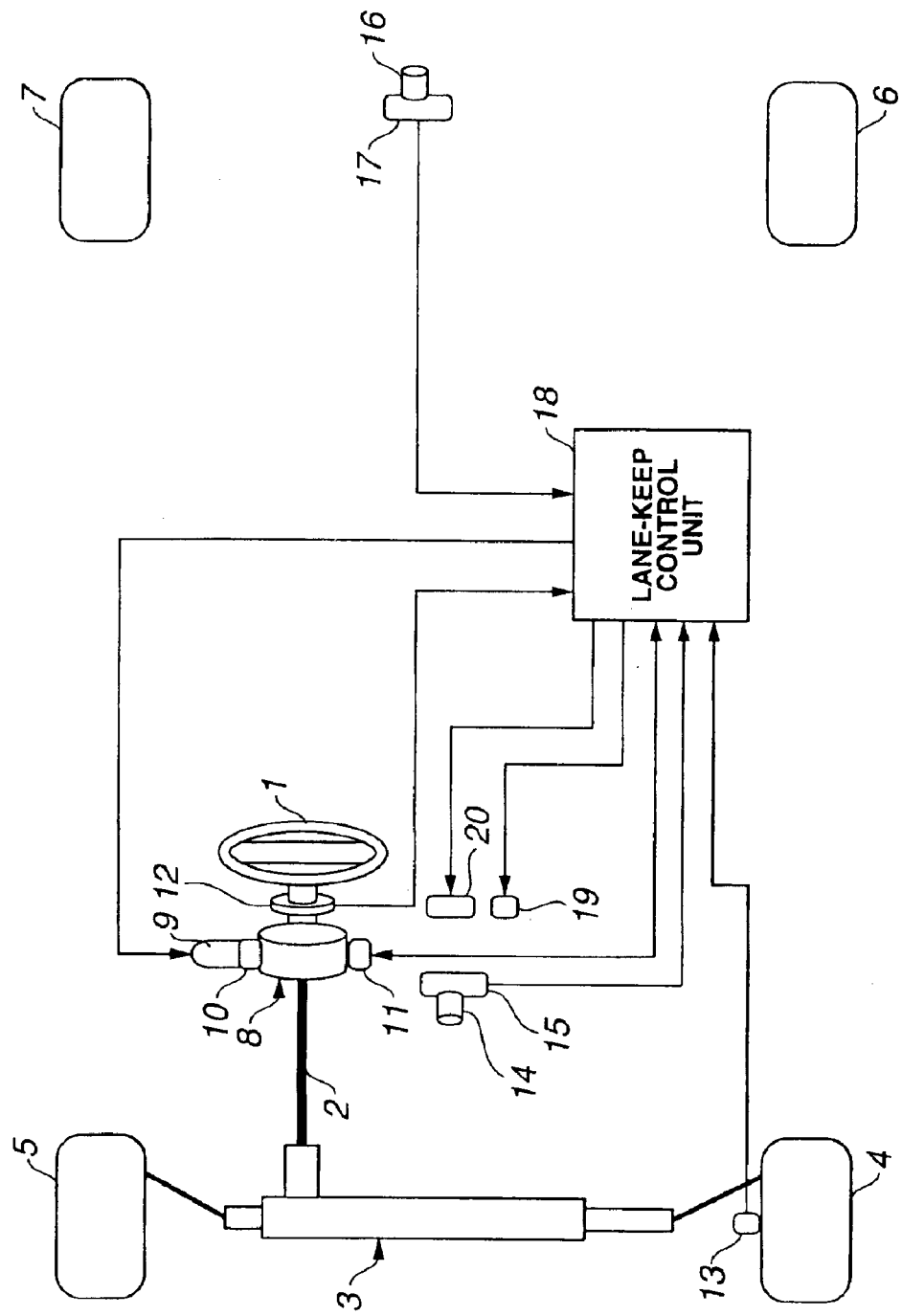
FIG. 1 is a schematic view showing a lane-keep control system for a vehicle according to an embodiment of the present invention.

As shown in FIG. 1, the host-vehicle equipped with the lane-keep control comprises a steering wheel 1 controlled by a driver, a column shaft 2 connected to steering wheel 1, a hydraulic power steering system 3, a left-front wheel 4, a right-front wheel 5, a left-rear wheel 6 and a right-rear wheel 7, a lane-guide actuator (steering actuator) 8, a motor 9, an electromagnetic clutch 10, a rotary encoder 11, a steering wheel angle sensor 12, a vehicle speed sensor 13, a lane recognition sensor 14, a lane recognition system 15, a subsequent-vehicle detecting sensor (rearward monitoring means) 16, a subsequent-vehicle position detecting device 17, a lane-keep control unit 18, a lane-deviation alarming buzzer 19, and a lane-deviation alarming display 20.

More specifically, a driver of the host-vehicle controls the direction of the vehicle by manipulating steering wheel 1 functioning as steering control means. According to the steering operation of the driver, a rotation angle of steering wheel 1 is transmitted to a steering gear set of hydraulic power steering system 3 through a column shaft 2. Accordingly, a rack of the steering gear set moves on a lateral (right-and-left) straight path, and the right and left front wheels 4 and 5 are steered.

Lane-guide actuator 8 functions as steering control means during the lane-keep control. Lane-guide actuator 8 comprises motor 9, electromagnetic clutch 10 which is turned on when an automatic cruise control (ACC) is being executed, and a transmission mechanism (not shown) which transmits the rotation of motor 9 to column shaft 2.

Lane-keep control unit 18 functions as lane-keep control means which moves the host-vehicle on a target lane defined by lane markers by outputting control commands to motor 9 and electromagnetic clutch 10 of the lane-guide actuator 8. Lane-keep control unit 18 receives various signals from rotary encoder 11, steering wheel angle sensor 12, vehicle speed sensor 13, lane-recognition device 15 and subsequent-vehicle position recognition device 17. Rotary encoder 11 detects a rotation angle signal of column shaft 2 and outputs the detected signal to lane-keep control unit 18. Steering wheel angle sensor 12 detects the steering wheel angle of steering wheel 1 and outputs a signal indicative of the steering wheel angle to lane-keep control unit 18. Vehicle speed sensor 13 detects the vehicle speed of the host-vehicle and outputs a signal indicative of the vehicle speed to lane-keep control unit 18. Lane-recognition sensor 14 obtains an image view ahead of the host-vehicle by means of a CCD camera and outputs signals indicative of the obtained image view. Lane-recognition device 15 recognizes a traveling lane on the basis of the signals of lane-recognition sensor 14, and outputs signals indicative of road curvature and a lateral displacement of the forward remarking point. Subsequent-vehicle detecting sensor 16 obtains a rear view of the host-vehicle by means of a CCD camera or a laser radar, and outputs signals indicative of the rearward view. Subsequent-vehicle position recognition device 17 recognizes a position of a subsequent-vehicle relative to the host-vehicle on the basis of the signals of subsequent-vehicle detecting sensor 16, and outputs signals indicative of the position of the subsequent-vehicle, an inter-vehicle distance between the host-vehicle and the subsequent-vehicle, and a relative speed between the vehicle speeds of the host-vehicle and the subsequent-vehicle.

Lane-keep control unit 18 executes the lane-keep control for moving the host-vehicle in a target lane by engaging electromagnetic clutch 10 and applying electric current to motor 9 on the basis of the received signals. During the lane-keep control, when at least one of the steering wheel angle θ, a steering wheel angle gradient dθ and a steering wheel torque T, which are generated by the operation of the driver becomes greater than thresholds, lane-keep control unit 18 executes a suspending control for suspending the lane-keep control. Further, when it is determined that the host-vehicle deviates from the target lane, lane-keep control unit 18 executes a deviation alarming control whereby deviation alarming buzzer 18 generates alarming sounds 18 and/or a deviation quantity of the host-vehicle is displayed in deviation alarming display 20.

The manner of operation of the lane-keep control system will be discussed hereinafter.

[Intervention Control Process]

Figure 2:
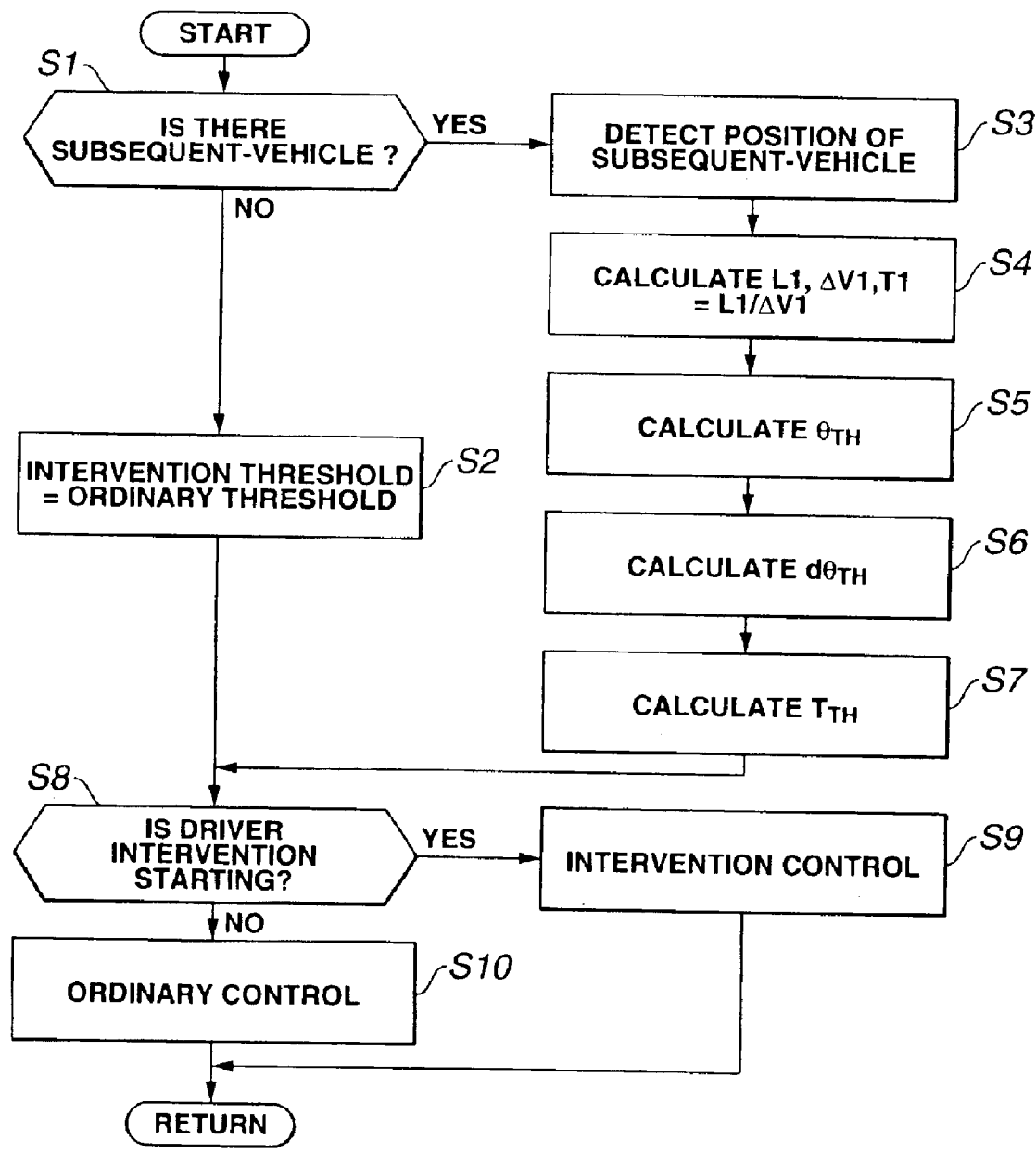
FIG. 2 is a flowchart showing an intervention control executed during the lane-keep control through a lane-keep control unit 18 of FIG. 1.

With reference to FIG. 2, there will be discussed an intervention control executed during the lane-keep control by lane-keep control unit 18.

At step S1, control unit 18 determines whether or not there is a subsequent-vehicle in the rearward direction of the host-vehicle. When the determination at step S1 is negative, that is, when there is no subsequent-vehicle in the rearward direction of the host-vehicle, the routine proceeds to step S2. When the determination at step S1 is affirmative, the routine proceeds to step S3.

Figure 3A:
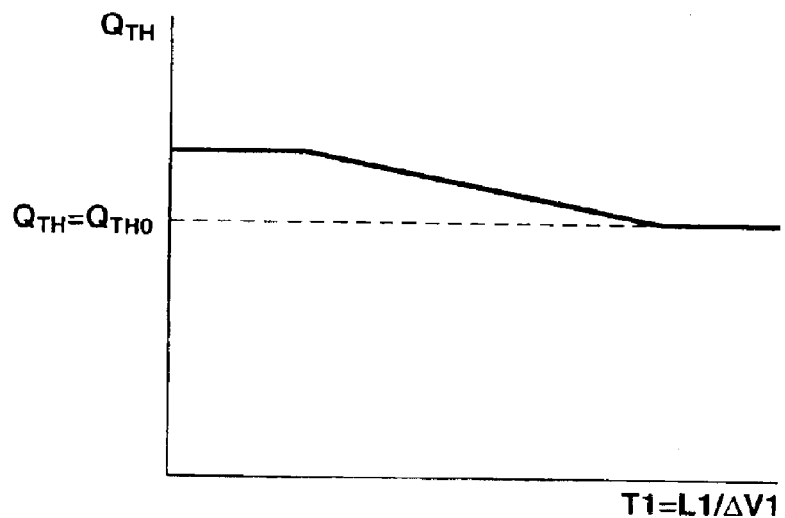
FIGS. 3A through 3C are maps showing characteristics of intervention thresholds employed in the intervention control.
Figure 3B:
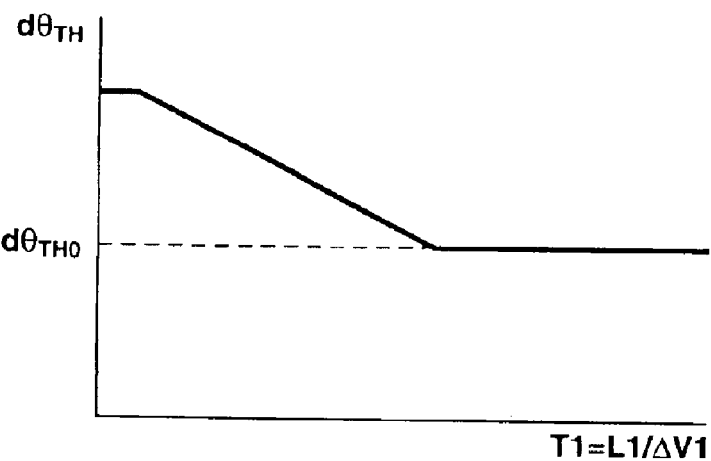
Figure 3C:
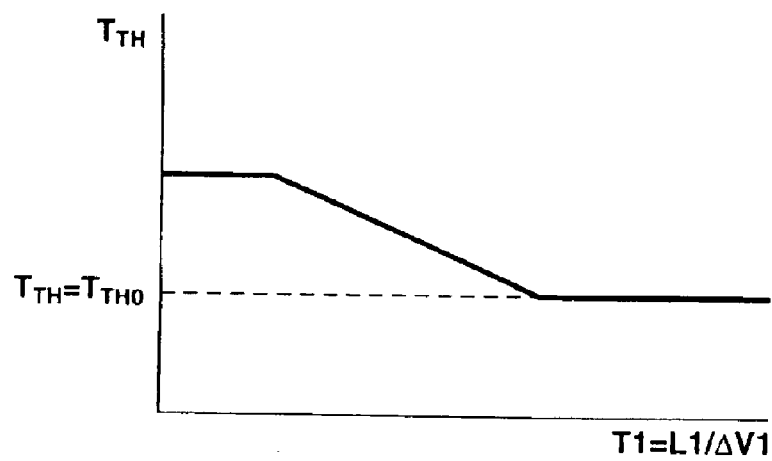

At step S2, control unit 18 sets the intervention thresholds $\theta_{TH}$, $d\theta_{TH}$ and $T_{TH}$ at ordinary thresholds (constant values) $\theta_{TH0}$, $d\theta_{TH0}$ and $T_{TH0}$ which are employed in the lane-keep control under a condition that there is no subsequent-vehicle behind the host-vehicle. More specifically, a threshold $\theta_{TH}$ of the steering wheel angle θ is set at $\theta_{TH0}$ ($\theta_{TH}=\theta_{TH0}$), a threshold $d\theta_{TH}$ of the steering-wheel angle gradient dθ is set at a constant value $d\theta_{TH0}$ ($d\theta_{TH}=d\theta_{TH0}$), and a threshold $T_{TH}$ of the steering wheel torque T is set at a constant value $T_{TH0}$ ($T_{TH}=T_{TH0}$), as shown in FIGS. 3A through 3C wherein this condition corresponds to a condition that a margin time T1 is infinitely large.

At step S3 subsequent to the affirmative determination at step S1, control unit 18 detects the position of the subsequent-vehicle. More specifically, control unit 18 determines whether the subsequent-vehicle approaching the host-vehicle is located at a right lane, a left lane or a same lane relative to the host-vehicle traveling lane. When control unit 18 determines that the subsequent-vehicle travels on and will pass through the right lane relative to the host-vehicle traveling lane, control unit 18 varies only the intervention thresholds employed in the lane-keep control for the right-hand-side lane deviation as shown in FIGS. 3A through 3C without varying the intervention thresholds for the left-hand-side lane deviation. Similarly, when control unit 18 determines that the subsequent-vehicle passes through the left lane relative to the host-vehicle traveling lane, control unit 18 varies only the intervention thresholds employed in the lane-keep control for the left-hand-side lane deviation as shown in FIGS. 3A through 3C without varying the intervention thresholds for the right-hand-side lane deviation. With these arrangements of varying only the intervention thresholds for the subsequent-vehicle passing side without varying those of the other side, it becomes possible that the driver further easily executes the steering operation.

When the subsequent-vehicle, which is traveling on the lane as same as that of the host-vehicle, approaches the host-vehicle, it is difficult to decide which one of the right and left lanes will be passed by the subsequent-vehicle. Therefore, the control unit 18 varies the intervention thresholds $\theta_{TH}$, $d\theta_{TH}$ and $T_{TH}$ for both of right and left lanes.

As a logic for detecting the subsequent-vehicle, there is adapted an optical flow type backward information detecting logic for detecting a subsequent-vehicle which approaches a host-vehicle from the rearward position of the host-vehicle, by using a motion vector (optical flow) on an image taken by a camera, such as a method disclosed in Japanese Patent Provisional Publication No. 11-255051.

At step S4, control unit 18 detects an inter-vehicle distance L1 and a relative speed ΔV1 of the approaching subsequent-vehicle, relative to the host-vehicle, and calculates the margin time (time gap) T1 (T1=ΔV1/L1). This step S4 functions as approaching degree detecting means for detecting an approaching degree of the subsequent-vehicle to the host-vehicle.

At step S5, control unit 18 calculates intervention threshold $\theta_{TH}$ as to steering-wheel angle θ, which threshold $\theta_{TH}$ increases as margin time T1 decreases, from a map showing a relationship between margin time T1 and intervention threshold $\theta_{TH}$ of steering wheel angle θ shown in FIG. 3A. This step S5 functions as threshold setting means for setting the intervention threshold of steering wheel angle θ.

At step S6, control unit 18 calculates intervention threshold $d\theta_{TH}$ as to steering-wheel angle gradient dθ, which threshold $d\theta_{TH}$ increases as margin time T1 decreases, from a map showing a relationship between margin time T1 and intervention threshold $d\theta_{TH}$ of steering-wheel angle gradient dθ shown in FIG. 3B. This step S6 functions as intervention threshold setting means for setting the intervention threshold of steering-wheel angle gradient dθ.

At step S7, control unit 18 calculates intervention threshold $T_{TH}$ as to steering wheel torque T, which threshold $T_{TH}$ increases as margin time T1 decreases, from a map showing a relationship between margin time T1 and intervention threshold $T_{TH}$ of steering wheel angle T shown in FIG. 3C. This step S7 functions as intervention threshold setting means for setting the intervention threshold of steering wheel torque T.

At step S8 subsequent to the execution of step S2 or step S7, control unit 18 determines whether the driver is starting driver intervention to the steering control. More specifically, control unit 18 determines whether least one of first, second and third conditions is satisfied under a subsequent-vehicle existing condition or not, wherein the first condition is that the actual steering wheel angle θ is greater than intervention threshold $\theta_{TH}$, the second condition is that the actual steering wheel angle gradient dθ is greater than intervention threshold $d\theta_{TH}$, and the third condition is that the actual steering wheel torque T is greater than intervention threshold $T_{TH}$. When the determination at step S8 is affirmative, that is, when at least one of the first, second and third conditions is satisfied, the routine proceeds to step S9. When the determination at step S8 is negative, that is, when neither of the first, second and third conditions is satisfied, the routine proceeds to step S10.

At step S9 subsequent to the affirmative determination at step S8, control unit 18 executes the intervention control (suspending control) for suspending the lane-keep control by gradually decreasing the output current applied to motor 9 so as not to impress strange feeling to the driver and by setting the output current at zero at a moment when a predetermined time period elapsed from the start of the intervention control.

At step S10 subsequent to the negative determination at step S8, control unit 18 executes an ordinary lane-keep control.

[Operation of the Lane-keep Control in Case that there is no Subsequent-Vehicle in a Rearward Area of the Host-vehicle]

When there is no subsequent-vehicle within a rearward area detected by the host-vehicle and when the driver executes no intervention operation, the routine of the flow-chart in FIG. 2 proceeds in the order of step S1→step S2→step S8→step S10 to execute the ordinary lane-keep control.

Figure 4:
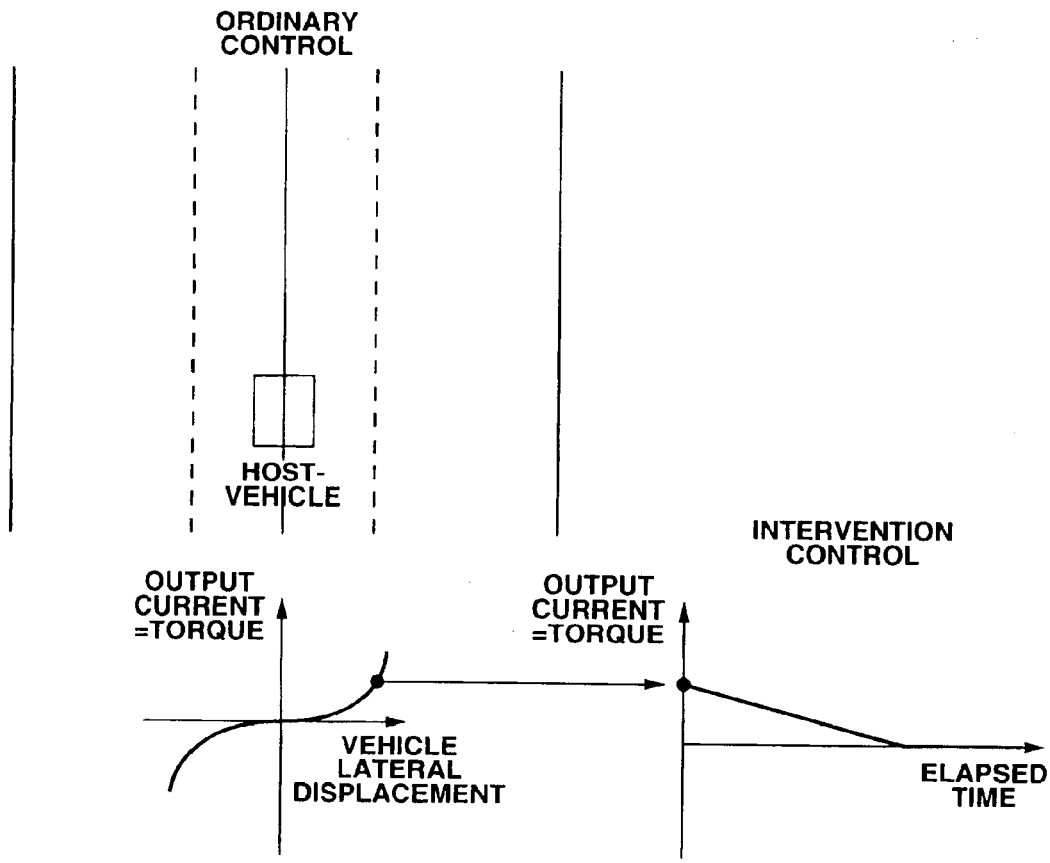
FIG. 4 is graphs showing motor output current characteristics in an ordinary lane-keep control and in the lane-keep control under a driver intervention applied state.

More specifically, the lane-keep control for moving the host-vehicle on a target lane (center position of the lane) by applying output current to motor 9 according to the lateral displacement of the vehicle relative to a center position of the host-vehicle traveling lane, as shown by an output current characteristics during the ordinary lane-keep control in FIG. 4.

When the driver executes the intervention control during the lane-keep control, the routine of the flowchart in FIG. 2 proceeds in the order of step S1→step S2→step S8→step S9 to execute the intervention control. More specifically, at step S2, control unit 18 sets intervention thresholds $\theta_{TH}$, $d\theta_{TH}$ and $T_{TH}$ at $\theta_{TH0}$, $d\theta_{TH0}$ and $T_{TH0}$ under the ordinary lane-keep control, respectively. At step S8, control unit 18 determines whether or not there is an intervention, on the basis of intervention thresholds $\theta_{TH0}$, $d\theta_{TH0}$ and $T_{TH0}$. At step S9, control unit 18 executes the intervention control for suspending the lane-keep control by gradually decreasing the output current applied to motor 8 according to the time elapse as shown by the output current characteristic during the driver intervention shown by a right-hand-side graph in FIG. 4.

That is, even if the lane-keep control is being executed, the intervention control is executed in reply to the detection of the driver's steering operation (driver intervention), so that the steering operation by the driver has higher priority than the lane-keep steering operation executed by control unit 18.

[Operation of the Lane-keep Control in Case that there is a Subsequent-vehicle in a Rearward Area of the Host-vehicle]

When there is a subsequent-vehicle within a detectable rearward area and when the driver executes the intervention control, the routine of the flowchart in FIG. 2 proceeds in the order of step S1→step S3→step S4→step S5→step S6→step S7→step S8 to execute the ordinary lane-keep control. By the execution of steps S5, S6 and S7, the intervention thresholds $\theta_{TH}$, $d\theta_{TH}$ and $T_{TH}$ are set at thresholds $\theta_{TH1}$, $d\theta_{TH1}$ and $T_{TH1}$ which are respectively greater than intervention thresholds $\theta_{TH0}$, $d\theta_{TH0}$ and $T_{TH0}$ employed in the ordinary lane-keep control, as shown in FIGS. 3A through 3C, since margin time T1 is smaller than a predetermined time.

By the execution of step S8, it is determined whether the driver is executing the steering intervention (driver intervention), by determining whether or not at least one of first, second and third condition is satisfied under a subsequent-vehicle existing condition, wherein the first condition is that an actual steering wheel angle θ is greater than intervention threshold $\theta_{TH}$, the second condition is that an actual steering wheel angle gradient dθ is greater than intervention threshold $d\theta_{TH}$, and the third condition is that an actual steering wheel torque T is greater than intervention threshold $T_{TH}$.

Figure 5:
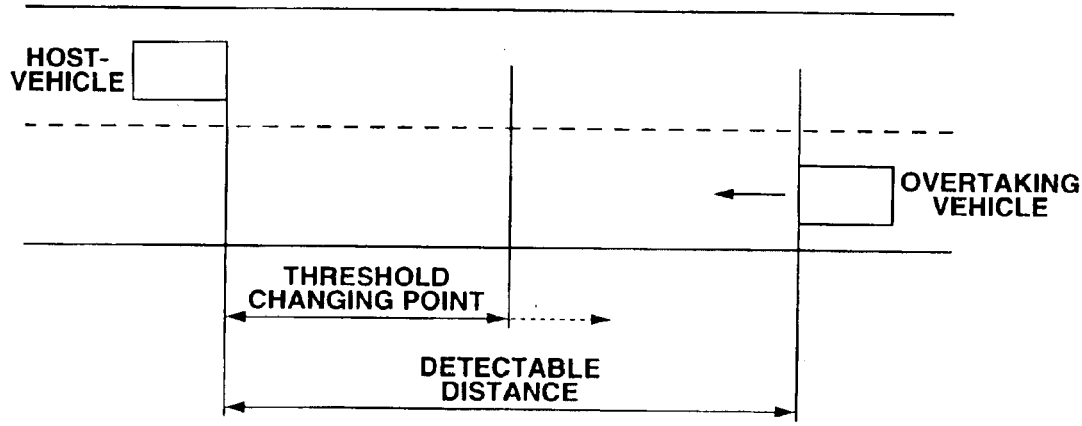
FIG. 5 is a schematic view showing a state that there is an approaching vehicle behind a host-vehicle.

Accordingly, when there is an approaching subsequent-vehicle behind the host-vehicle as shown in FIG. 5, intervention thresholds $\theta_{TH}$, $d\theta_{TH}$ and $T_{TH}$ are set at thresholds $\theta_{TH1}$, $d\theta_{TH1}$ and $T_{TH1}$ which are higher than ordinary intervention thresholds $\theta_{TH0}$, $d\theta_{TH0}$ and $T_{TH0}$ employed in the ordinary lane-keep control. Therefore, even if the driver steers the host-vehicle toward a lane which will be passed by the approaching vehicle, the actual values θ, dθ and T hardly become greater than the intervention thresholds $\theta_{TH1}$, $d\theta_{TH1}$ and $T_{TH1}$. This arrangement lowers the possibility of the intervention determination during the approach of the subsequent-vehicle. This determination corresponds to the negative determination at step S8. As a result, the ordinary lane-keep control is maintained by the execution of step S10.

Therefore, the driver feels the reaction force from steering wheel 1 due to the steering wheel torque T generated by lane-guide actuator 8 which controls the host-vehicle toward a target lane (center position) of the traveling lane. This effectively prevents the host-vehicle from deviating toward the lane passed by the subsequent-vehicle.

Further, at steps S5, S6 and S7, as margin time T1 is shorter, in other words, as the approaching degree of the subsequent-vehicle to the host vehicle is larger, intervention thresholds $\theta_{TH}$, $d\theta_{TH}$ and $T_{TH}$ are set at higher values $\theta_{TH1}$, $d\theta_{TH1}$ and $T_{TH1}$ which are gradually increase with the decrease of margin time T1 as shown in FIGS. 3A, 3B and 3C. Accordingly, control unit 18 resists the determination of the driver intervention.

Therefore, when the approaching degree of the subsequent-vehicle to the host-vehicle is high, the driver can recognize this subsequent-vehicle approaching state from the reaction force of steering wheel 1 against the driver's steering operation toward the lane of the approaching subsequent-vehicle. Further, when the approaching degree of the subsequent-vehicle to the host-vehicle is low, control unit 18 properly determines the driver intervention so as not to prevent the steering operation of the driver. This enables the driver to naturally drive the host-vehicle.

Next, there will be discussed the advantages gained the lane-keep control system according to the present invention.

(1) When there is a subsequent-vehicle approaching the host-vehicle, intervention thresholds $\theta_{TH}$, $d\theta_{TH}$ and $T_{TH}$ are set at the higher thresholds $\theta_{TH1}$, $d\theta_{TH1}$ and $T_{TH1}$. Therefore, even if the driver steers the host-vehicle toward a lane on which the approaching vehicle will pass, the lane-keep control system resists the driver intervention, and the ordinary lane-keep control is maintained. Accordingly, the driver feels the reaction force from steering wheel 1. This effectively prevents the host-vehicle from deviating toward the lane to be passed by the subsequent-vehicle.

(2) At steps S5, S6 and S7, intervention thresholds $\theta_{TH}$, $d\theta_{TH}$ and $T_{TH}$ are set at higher values as margin time T1 is shorter, in other words, as the approaching degree of the subsequent-vehicle to the host vehicle is higher. Accordingly, when the approaching degree of the subsequent-vehicle to the host-vehicle is high, the driver can early recognize this subsequent-vehicle approaching state. When the approaching degree of the subsequent-vehicle to the host vehicle is low, lane-keep control unit 18 properly determines intervention thresholds $\theta_{TH}$, $d\theta_{TH}$ and $T_{TH}$ so as not to prevent the steering operation of the driver. This enables the driver to agreeably drive the host-vehicle.

(3) Margin time T1 calculated by the execution of step S4 is defined as an approaching degree of the subsequent-vehicle to the host-vehicle, and intervention thresholds $\theta_{TH}$, $d\theta_{TH}$ and $T_{TH}$ are varied according margin time T1. Therefore, it becomes possible to set intervention thresholds $\theta_{TH}$, $d\theta_{TH}$ and $T_{TH}$ so that control unit 18 resists the detection of the driver intervention at an optimum timing when margin time T1 is adjusted at a constant time.

This application is based on Japanese Patent Applications No. 2001-213345 filed on Jul. 13, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching.

For example, although the first embodiment has been shown and described such that the intervention thresholds $\theta_{TH}$, $d\theta_{TH}$ and $T_{TH}$ are set according to the margin time T1 indicative of the approaching degree of a subsequent-vehicle to the host-vehicle, the intervention thresholds $\theta_{TH}$, $d\theta_{TH}$ and $T_{TH}$ may be set according to inter-vehicle distance L1 between the host-vehicle and the approaching subsequent-vehicle as parameter indicative of the approaching degree. When this inter-vehicle distance L1 is employed, the approaching degree is obtained by detecting the inter-vehicle distance L1. Therefore, even in a case that margin time T1 takes a large value for the reason that inter-vehicle distance L1 is small and relative speed ΔV1 is extremely small, it is possible to early execute the determination of the intervention in a difficult condition at the time when the approach of the subsequent-vehicle is detected.

Further, the intervention thresholds $θ_{TH}$, $dθ_{TH}$ and $T_{TH}$ may be set according to relative speed ΔV1 between the host-vehicle speed and an approaching subsequent-vehicle speed indicative of the approaching degree. By employing this relative speed ΔV1 as the approaching degree of the subsequent-vehicle to the host-vehicle, even when relative speed ΔV1 is high and the subsequent-vehicle quickly approaches the host-vehicle, it is possible to early set the determination of the intervention in a difficult condition at the time when the subsequent-vehicle is located at a position apart from the host-vehicle by inter-vehicle distance L1.

Although the embodiment has been shown and described to employ the steering wheel angle, the steering wheel angle gradient and the steering wheel torque for the determination of the intervention relative to the lane-keep control, it will be understood that one or two of the steering wheel angle, the steering wheel angle gradient and the steering wheel torque may be employed for the determination of the intervention relative to the lane-keep control. Additionally, other elements may be further employed for the determination of the intervention. The scope of the invention is defined with reference to the following claims.

What is claimed is:

1. A lane-keep control system for a host-vehicle, comprising:
   a control unit programmed,
      to execute a lane-keep control for moving the host-vehicle in a traveling lane,
      to determine whether there is an approaching-vehicle behind the host-vehicle,
      to increase an intervention threshold when there is the approaching vehicle behind the host-vehicle, and
      to suspend the lane-keep control when a steering control indicative value due to driver intervention is greater than the intervention threshold.

2. The lane-keep control system as claimed in claim 1, wherein the intervention threshold includes a right-lane-side intervention threshold and a left-lane-side intervention threshold which are respectively set for right and left lanes relative to the traveling lane of the host-vehicle, the control unit being programmed to detect a lane traveled by the approaching-vehicle and to increase only one of the right-lane-side and left-lane-side intervention thresholds corresponding to the detected lane traveled by the approaching-vehicle.

3. The lane-keep control system as claimed in claim 1, wherein the control unit is further programmed to detect approaching degree of the approaching-vehicle to the host-vehicle and to increase the intervention threshold according to the increase of the approaching degree.

4. The lane-keep control system as claimed in claim 3, wherein the approaching degree is obtained from an inter-vehicle distance between the host-vehicle and the approaching-vehicle.

5. The lane-keep control system as claimed in claim 3, wherein the approaching degree is obtained from a relative speed between a vehicle speed of the host-vehicle and a vehicle speed of the approaching-vehicle.

6. The lane-keep control system as claimed in claim 3, wherein the approaching degree is obtained from a margin time which is obtained by dividing an inter-vehicle distance between the host-vehicle and the approaching vehicle by a relative speed between a vehicle speed of the host-vehicle and a vehicle speed of the approaching-vehicle.

7. The lane-keep control system as claimed in claim 6, wherein the intervention threshold is increased with decrease of the margin time and is set at a constant value when the margin time is greater than a predetermined time period.

8. The lane-keep control system as claimed in claim 1, wherein the steering control indicative value due to driver intervention includes a steering wheel angle, a steering wheel angle gradient and a steering wheel torque.

9. A lane-keep control system of a host-vehicle comprising:
   a steering system through which a direction of the host-vehicle is controlled;
   a steering operation detecting device that detects an operation of a steering system of the host vehicle;
   a lane-recognition device that recognizes a traveling lane of the host-vehicle;
   a subsequent-vehicle position recognition device that detects whether there is a subsequent-vehicle behind the host-vehicle;
   a control unit programmed,
      to execute a lane-keep control on the basis of a recognition result of the lane-recognition device,
      to determine whether a vehicle exists behind the host-vehicle, on the basis of a detection result of the subsequent-vehicle position recognition device,
      to increase an intervention threshold when the vehicle exists behind the host-vehicle,
      to determine whether a detection result of the steering operation detecting device is greater with the intervention threshold, and
      to suspend the lane-keep control when the detection result of the steering operation detecting device is greater with the intervention threshold.

10. A method of executing a lane-keep control of a host-vehicle, comprising:
   executing a lane-keep control for moving the host-vehicle in a traveling lane;
   determining whether there is an approaching-vehicle behind the host-vehicle;
   increasing an intervention threshold when there is the approaching vehicle behind the host-vehicle; and
   suspending the lane-keep control when a steering control indicative value due to driver intervention is greater than the intervention threshold.

11. A lane-keep control system for a host-vehicle, comprising:
   control executing means for executing a lane-keep control for moving the host-vehicle in a traveling lane;
   determining means for determining whether there is an approaching-vehicle behind the host-vehicle;
   threshold setting means for increasing an intervention threshold when there is the approaching vehicle behind the host-vehicle; and
   control suspending means for suspend the lane-keep control when a steering control indicative value due to a steering operation of a driver of the host-vehicle is greater than the intervention threshold.

* * * * *